(12) United States Patent
Erps et al.

(10) Patent No.: US 6,412,820 B1
(45) Date of Patent: Jul. 2, 2002

(54) SECURED COUPLING ASSEMBLY AND METHOD OF PREVENTING LOOSENING

(75) Inventors: Ralph M. Erps, Salem; James A. Mc Namee, Burlington; Matthew Kaminske, Byfield, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/425,608

(22) Filed: Oct. 22, 1999

(51) Int. Cl.[7] .............................. F16L 55/00; F16J 15/00
(52) U.S. Cl. .............................. 285/92; 285/45; 285/47; 285/123.1; 285/123.15; 285/123.16; 285/353
(58) Field of Search .................. 285/47, 92, 353, 285/45; 60/39.2

(56) References Cited

U.S. PATENT DOCUMENTS

| | | | | |
|---|---|---|---|---|
| 3,351,361 A | * | 11/1967 | Martin | 285/92 |
| 3,645,564 A | * | 2/1972 | Corriston | 285/47 |
| 3,675,950 A | * | 7/1972 | Beene | 285/45 |
| 3,680,631 A | * | 8/1972 | Allen et al. | 166/57 |
| 3,784,236 A | * | 1/1974 | Slocum | 285/45 |
| 3,794,358 A | * | 2/1974 | Allen et al. | 285/47 |
| 3,799,584 A | * | 3/1974 | Slocum | 285/45 |
| 3,861,719 A | * | 1/1975 | Hand | 285/47 |
| 3,915,478 A | * | 10/1975 | Al et al. | 285/45 |
| 4,099,747 A | * | 7/1978 | Meserole | 285/174 |
| 4,295,669 A | * | 10/1981 | LaPrade et al. | 285/47 |
| 4,296,950 A | * | 10/1981 | Chamberlin | 285/45 |
| 4,422,674 A | * | 12/1983 | Steuernagle | 285/30 |
| 4,422,675 A | * | 12/1983 | Norris et al. | 285/45 |
| 5,090,738 A | * | 2/1992 | Rakieski | 285/45 |
| 5,716,082 A | * | 2/1998 | Vogel et al. | 285/343 |
| 5,890,745 A | * | 4/1999 | Mueller | 285/92 |
| 5,934,712 A | * | 8/1999 | Friedrich et al. | 285/123.15 |
| 5,951,060 A | * | 9/1999 | Fukano et al. | 285/92 |

FOREIGN PATENT DOCUMENTS

GB 0624386 A * 8/1949 ................. 285/92

* cited by examiner

Primary Examiner—B. Dayoan
Assistant Examiner—Carlos Lugo
(74) Attorney, Agent, or Firm—Andrew C. Hess; Nathan D. Herkamp

(57) ABSTRACT

A coupling assembly includes a first coupling member, a second coupling member, and a coupling nut disposed over a portion of the second coupling member and threadingly engaging the first coupling member to retain the first and second coupling members together. An insulation blanket encloses the coupling nut, and a retention strip having a first end attached to an inner surface of the insulation blanket and a second end attached to the coupling nut is provided to prevent loosening of the coupling nut.

14 Claims, 2 Drawing Sheets

SECURED COUPLING ASSEMBLY AND METHOD OF PREVENTING LOOSENING

BACKGROUND OF THE INVENTION

This invention relates generally to gas turbine engines and more particularly to oil line fittings in such engines.

A gas turbine engine includes many components, such as bearings, gears and splines, which need to be lubricated during operation of the engine. Commonly, a gas turbine engine incorporates a self-contained, re-circulating sump oil system to provide lubrication for these components as well as for cooling purposes. Various oil lines are utilized to circulate the lubricant about the system. These oil lines are often exposed to high temperature, sonic velocity air flow which can be detrimental to the integrity of the lines. Furthermore, the high temperature air flow can cause thermally generated breakdown products (i.e., "coke") to form in the oil lines, thus hindering the proper lubrication of the engine components.

To protect against coking, the oil lines typically comprise a double-walled configuration that provides adequate insulation from the high temperature air flow. However, the oil line fittings that connect the oil lines to other components such as the sump or bearing housing require another means of protection. Thus, the oil line fittings are commonly enclosed by an insulation blanket, which is composed of very light gage, high temperature steel sheets enclosing high temperature insulation material. The insulation blanket thus protects the oil line fitting from the high temperature air flow and assures proper lubrication to the engine.

A potential problem encountered by all fittings in a gas turbine engine is loosening of the fitting due to engine vibrations that occur during operation. In the case of oil line fittings, a full separation of the oil line could dump sufficient oil into the combustion chamber to cause an engine fire. One known approach to preventing undesired loosening of fittings is the use of safety wire. Safety wiring is the securing together of two or more parts with wire such that any tendency of a threaded part to loosen will be counteracted by an additional tightening of the wire. With an oil line fitting, the wire would need to be strung through holes in the fitting and secured by anchors welded to the bearing housing.

However, safety wiring is difficult to use with oil line fittings because there is limited access to such fittings and there is limited free space due to the use of the insulation blankets. Also, the use of safety wiring would require substantial modifications in that the wire holes would need to be drilled in the fittings and insulation blankets, and anchors would need to be welded to the appropriate structure. The wire holes in the insulation blanket would also reduce its insulating effectiveness.

Accordingly, there is a need for an approach to preventing loosening of fittings, particularly oil line fittings, that is easy to install in a confined space and does not require substantial modifications to the fitting.

SUMMARY OF THE INVENTION

The above-mentioned need is met by the present invention which provides a coupling assembly having a first coupling member, a second coupling member, and a coupling nut disposed over a portion of the second coupling member and threadingly engaging the first coupling member to retain the first and second coupling members together. An insulation blanket encloses the coupling nut, and a retention strip having a first end attached to an inner surface of the insulation blanket and a second end attached to the coupling nut is provided to prevent loosening of the coupling nut.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
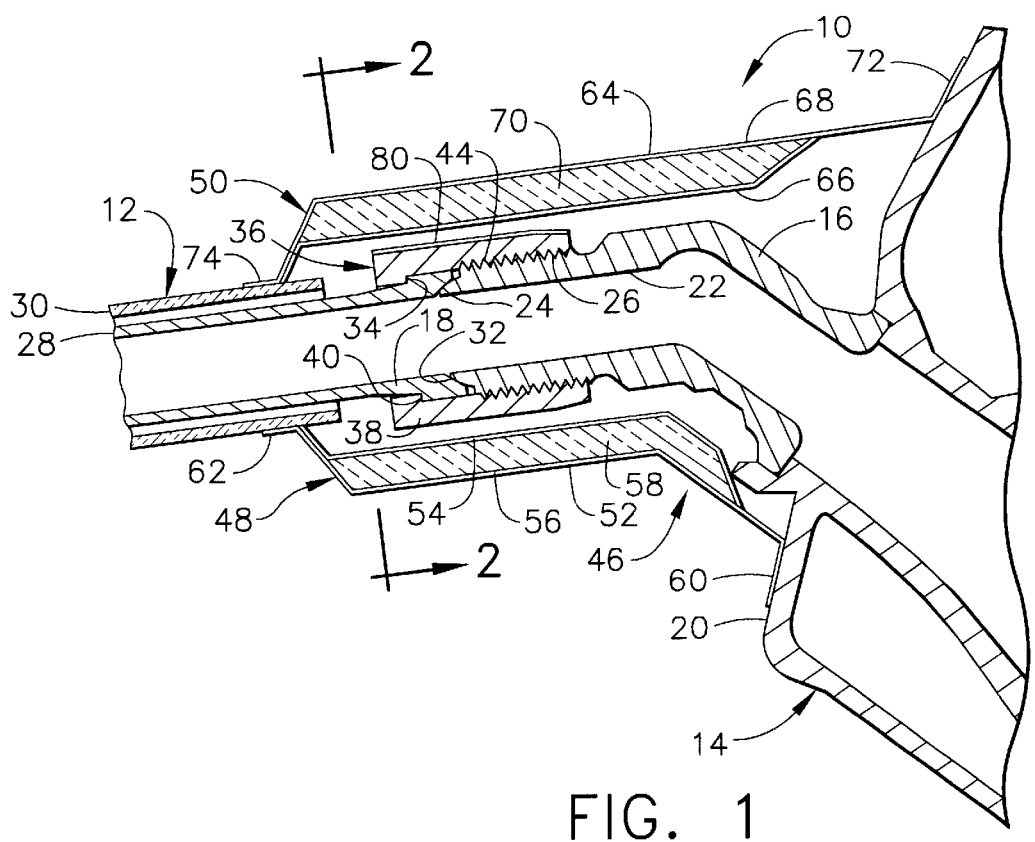
FIG. 1 is a longitudinal sectional view of the coupling of the present invention.

Referring to the drawings wherein identical reference numerals denote the same elements throughout the various views, FIGS. 1–4 illustrate the coupling assembly 10 of the present invention. In one preferred embodiment, the coupling assembly 10 is an oil line fitting that fluidly connects a fluid carrying tube 12, such as an oil line, to a housing 14, such as a sump or bearing housing. While an oil line fitting such as that used in a gas turbine engine is being used as an example to facilitate disclosure of the inventive concept of the present invention, it should be recognized that the present invention is not limited to oil line fittings and is applicable to a wide variety of coupling assemblies.

The coupling assembly 10 includes a first coupling member 16 and a second coupling member 18 that are arranged coaxially about a common central axis. The first and second coupling members 16 and 18 may be formed of any material capable of accommodating the types of fluids, pressures, temperatures, etc. to which the coupling assembly 10 will be exposed. Suitable materials include, but are not limited to, stainless steel, superalloys and titanium.

As best seen in FIG. 1, the first coupling member 16 is in the form of a nipple extending outwardly from the outer wall 20 of the housing 14 and has a bore 22 extending therethrough so as to provide fluid communication with the interior of the housing 14. A spherical or crowned first seal surface 24 is formed on the distal end of the first coupling member 16, and a set of external threads 26 is formed on the outer surface of first coupling member 16.

Preferably, the tube 12 is of a double-walled construction having concentric inner and outer tubular walls 28 and 30 as shown in FIG. 1. The second coupling member 18 is a ferrule integrally formed on, or otherwise attached to, the end of the inner wall 28. The second coupling member 18 includes a generally frusto-conical second seal surface 32 that is configured for mating sealing engagement with the first seal surface 24. A first annular abutment surface 34 is disposed on the outer surface of second coupling member 18.

Figure 2:
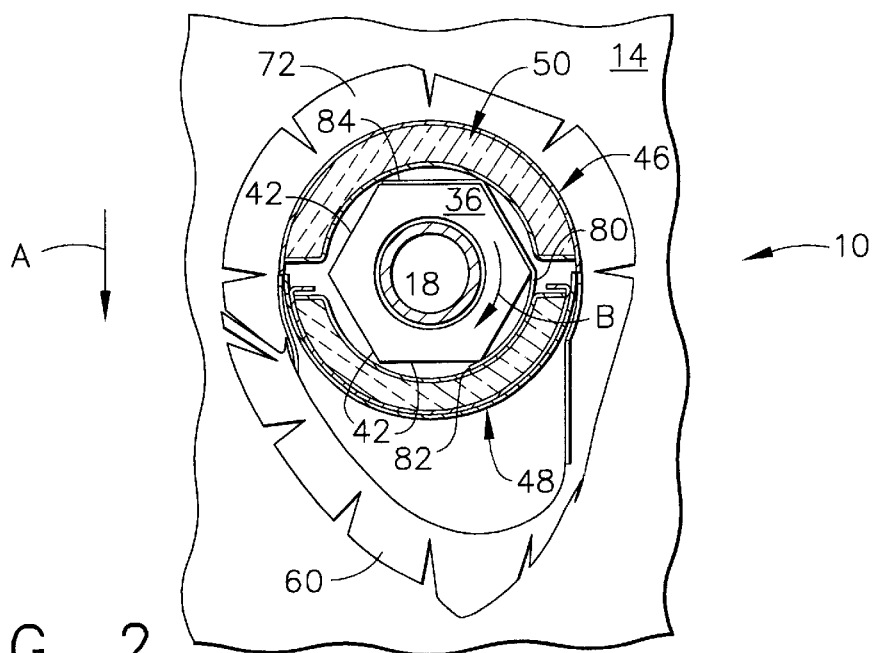
FIG. 2 is a traverse sectional view taken along line 2—2 of FIG. 1.
Figure 3:
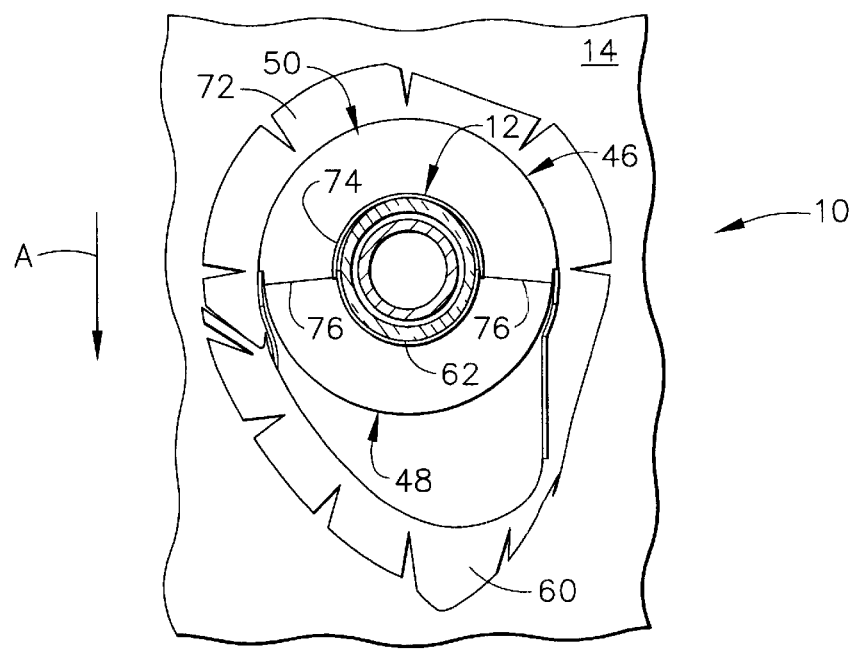
FIG. 3 is a top view of the coupling assembly of the present invention.
Figure 4:
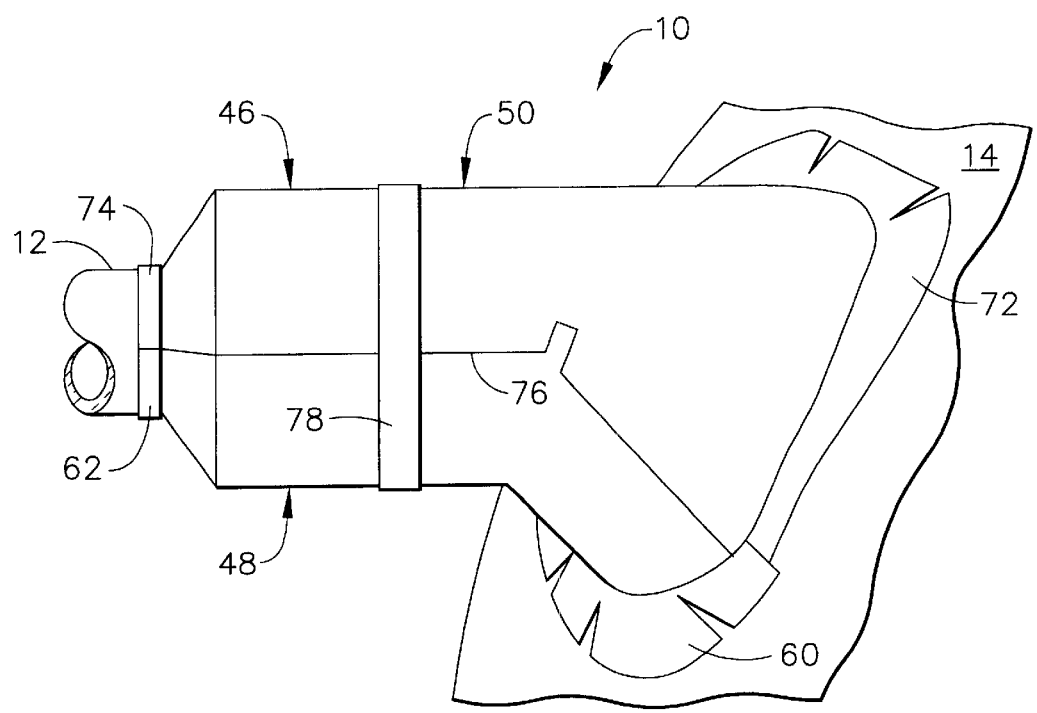
FIG. 4 is an isometric view of the coupling assembly of the present invention.

The coupling assembly 10 further comprises a coupling nut 36 that is disposed in surrounding relationship with the second coupling member 18. The coupling nut 36 includes a flange 38 extending radially inward at one end thereof. The flange 38 defines a second annular abutment surface 40 that engages the first abutment surface 34. As seen in FIG. 2, the coupling nut 36 is provided with an external wrenching surface, which preferably has a hexagonal shape, so as to define a plurality of wrench flats 42. A set of internal threads 44 is formed on an inner surface of the coupling nut 36, at the end opposite the flange 38.

The coupling nut 36 and the first coupling member 16 threadingly engage one another via engagement of the internal threads 44 with the external threads 26. This causes the second abutment surface 40 on the coupling nut 36 to contact the first abutment surface 34 on the second coupling member 18. Tightening of the coupling nut 36 exerts an axial load on the second coupling member 18 which forces the second seal surface 32 against the first seal surface 24 to form a contact seal between the first and second coupling members 16 and 18 and thereby fluidly connect the tube 12 with the interior of the housing 14. By providing the first seal surface 24 and the second seal surface 32 with spherical and conical configurations, respectively, alignment of these two surfaces is facilitated and a fluid tight seal is ensured when the coupling nut 36 is properly torqued. It should be noted that the surface configurations could be easily reversed. That is, the first seal surface 24 could be conical, and the second seal surface 32 could be spherical.

An insulation blanket 46 is disposed around the coupling assembly 10 to thermally protect it from high temperature environments. The insulation blanket 46 includes first and second sections 48 and 50 which are essentially semi-cylindrical half shells that are combined to fully enclose the coupling assembly 10.

The first section 48 comprises a substantially semi-cylindrical main portion 52 that has inner and outer sheets 54 and 56 enclosing a conventional high temperature insulation material 58. Both the inner and outer sheets 54 and 56 are preferably made of a relatively durable material such as light gage, high temperature steel. A flange 60 is disposed on one end of the main portion 52 and a small semi-cylindrical extension 62 is disposed on the other end. The second section 50 is quite similar to the first section 48 in that it includes a substantially semi-cylindrical main portion 64 having inner and outer sheets 66 and 68 enclosing a high temperature insulation material 70, a flange 72 disposed on one end of the main portion 64, and a small semi-cylindrical extension 74 disposed on the other end.

The first and second sections 48 and 50 are arranged on opposite sides of the coupling assembly 10. Thus, the respective main portions 52 and 64 combine to form a substantially cylindrical shell that encloses the first coupling member 16, the second coupling member 18, and the coupling nut 36. The respective extensions 62 and 74 form a ring that encircles the tube outer wall 30. Both flanges 60 and 72 are attached to the outer wall 20 of the housing 14 by any suitable means such as spot welding. The semi-cylindrical extensions 62 and 74 are likewise secured to the tube outer wall 30 by suitable means such as spot welding. The side seams 76 (FIG. 4) formed between the first and second sections 48 and 50 are also welded. Thus, the insulation blanket 46 is fixed with respect to the housing 14 and the first coupling member 16.

The second section 50 is slightly larger than the first section 48 so that when the two sections 48 and 50 are assembled, the second section 50 overlaps the first section 48. When the insulation blanket 46 is arranged so that the larger second section 50 faces the direction of flow (represented by arrow A in FIGS. 2 and 3), neither one of the seams 76 is facing upstream. Thus, if the coupling assembly 10 is placed in a high velocity flow stream, which is often the case for coupling assemblies used in gas turbine engines as well as many other applications, then the flow is less likely to pull the two sections 48 and 50 apart. An external strap 78 can optionally be provided to further protect against undesired separation of the first and second sections 48 and 50. The external strap 78 encircles both main portions 52 and 64 and is welded thereto.

The coupling assembly 10 further includes a retention strip 80 for preventing loosening of the coupling nut 36. The retention strip 80 is a sturdy strip having a first end 82 attached to the inner surface of the insulation blanket 46 and a second end 84 attached to the coupling nut 36. Attachment of the retention strip to the insulation blanket 46 and coupling nut 36 can be accomplished in any suitable manner such as welding. Specifically, the first end 82 of the retention strip 80 is attached to the inner surface of the first section 48 of the insulation blanket 46 and the second end 84 is attached to one of the wrench flats 42 of the coupling nut 36. The retention strip 80 is situation so as to extend from its first end 82 to its second end 84 in a direction opposite to the tightening direction of the coupling nut 36 (shown by arrow B in FIG. 2). Since the insulation blanket 46 is secured to the housing 14, the retention strip 80 provides a positive safety feature that prevents the coupling nut 36 from loosening.

The retention strip 80 is made of a material that is sufficiently strong to retain the coupling nut 36, weldable and compatible with the insulation blanket material. Examples of suitably materials include steel and nichrome. The retention strip 80 must be of sufficient length to be readily attached to one of the wrench flats 42 of the coupling nut 36. In the case of a hexagonal coupling nut, it is thus preferred that the retention strip 80 is long enough to extend through at least a 90 degree arc about the coupling nut 36. This is because, since there is a 60 degree arc between the centers of adjacent flats 42 on a hexagonal nut, a 90 degree arc will assure that the retention strip 80 covers the center of a flat 42, thereby providing sufficient area to assure a good weld. It is also preferred that the retention strip 80 is as least as wide as the coupling nut 36 to further assure that there is sufficient area to provide a good weld. The retention strip 80 preferably has a thickness of approximately 0.005 inches to provide adequate strength. Likewise, the insulation blanket 46 should have sufficient structural integrity to support the retention strip 80. Preferably, the inner and outer sheets (54, 56, 66 and 68) of the first and second sections 48 and 50 are each about 0.005 inches thick.

To install the coupling assembly 10, the second coupling member 18 is aligned with the first coupling member 16, and the coupling nut 36 is threaded onto the first coupling member 16 so as to connect the two coupling members 16 and 18 in a known manner. The first end 82 of the retention strip 80 is attached to an inner surface of first section 48 of the insulation blanket 46, and the first section 48 is put in place against the downstream side of the assembled first coupling member 16, second coupling member 18 and coupling nut 36. (Although the retention strip 80 alternatively can be attached to the second section 50, it is preferred to use the smaller first section 48 because it provides better access.) The first section flange 60 is spot welded to the housing outer wall 20, and the first section extension 62 is spot welded to the tube outer wall 30. Next, the retention strip 80 is bent over the coupling nut 36, and the second end 84 is attached to one of the wrench flats 42, preferably by spot welding. The second section 50 is then positioned on the upstream side of the assembly, opposite to the first section 48, so that it overlaps the first section 48. Once the second section 50 is in position, the second section flange 72 is spot welded to the housing outer wall 20, and the second section extension 74 is spot welded to the tube outer wall 30. If the optional external strap 78 is not being used, then the side seams 76 are welded to complete the installation. If the optional external strap 78 is being used, then the side seams 76 are spot welded and the external strap 78 is attached to the insulation blanket 46 over the spot welds. Then, the remaining portions of the side seams 76 are welded.

Thus, the retention strip 80 is easily installed as just another step in the overall installation process, using the same tools and techniques required for the other assembly steps. The retention strip 80 can only be installed correctly because it is part of the installation blanket 46 itself and is therefore oriented by the installation blanket 46. No modifications to the fittings or the housing are required for this invention.

While the present invention has been fully described in connection with coupling assemblies having insulation blankets, it should be noted that other embodiments are possible. For instance, the present invention could be incorporated into fittings in which insulation blankets are not used by attaching the first end of the retention strip to another fixed structure, such as a housing.

The foregoing has described a coupling assembly that has a welded retention strip for preventing loosening of the coupling nut. While specific embodiments of the present invention have been described, it will be apparent to those skilled in the art that various modifications thereto can be made without departing from the spirit and scope of the invention as defined in the appended claims.

What is claimed is:

1. A coupling assembly comprising:
   a first coupling member;
   a second coupling member;
   a coupling nut disposed over a portion of said second coupling member and threadingly engaging said first coupling member to retain said first and second coupling members together;
   an insulation blanket enclosing said coupling nut; and
   a retention strip having a first end attached to an inner surface of said insulation blanket and a second end attached to said coupling nut.

2. The coupling assembly of claim 1 wherein said retention strip extends from its first end to its second end in a direction that is opposite to the tightening direction of said coupling nut.

3. The coupling assembly of claim 1 wherein said insulation blanket is fixed with respect to said first coupling member.

4. The coupling assembly of claim 1 wherein said insulation blanket comprises first and second sections and said end of said retention strip is attached to said first section.

5. The coupling assembly of claim 4 wherein said second section is larger than said first section.

6. The coupling assembly of claim 1 wherein said retention strip is at least as wide as said coupling nut.

7. A coupling assembly comprising:
   a first coupling member extending from a housing;
   a second coupling member arranged coaxially with said first coupling member;
   a coupling nut disposed over a portion of said second coupling member and threadingly engaging said first coupling member to retain said first and second coupling members together;
   an insulation blanket enclosing said coupling nut and fixed with respect to said housing; and
   a retention strip having a first end attached to an inner surface of said insulation blanket and a second end attached to said coupling nut.

8. The coupling assembly of claim 7 wherein said retention strip extends from its first end to its second end in a direction that is opposite to the tightening direction of said coupling nut.

9. The coupling assembly of claim 7 wherein said insulation blanket comprises a first section having a flange that is attached to said housing and a second section having a flange that is attached to said housing, and said first end of said retention strip is attached to said first section.

10. The coupling assembly of claim 9 wherein said second section is larger than said first section.

11. The coupling assembly of claim 7 wherein said retention strip is at least as wide as said coupling nut.

12. In a coupling assembly having a first coupling member, a second coupling member, a coupling nut connecting said first and second coupling members, and an insulation blanket enclosing said coupling nut, a method of preventing loosening of said coupling nut, said method comprising the steps of:
   attaching a first end of a retention strip to said insulation blanket; and
   attaching a second end of said retention strip to said coupling nut.

13. The method of claim 12 wherein said retention strip is arranged to extend from its first end to its second end in a direction that is opposite to the tightening direction of said coupling nut.

14. The method of claim 12 wherein said first end of said retention strip is welded to said insulation blanket, and said second end of said retention strip is welded to said coupling nut.

* * * * *